United States Patent [19]
Knaefel et al.

[11] 3,805,011
[45] Apr. 16, 1974

[54] METHOD AND APPARATUS FOR WELDING

[75] Inventors: James O. Knaefel, Willoughby; Phillip E. Robinson, Wickliffe, both of Ohio

[73] Assignee: Parker-Hannifin Corporation, Cleveland, Ohio

[22] Filed: Aug. 30, 1972

[21] Appl. No.: 284,739

[52] U.S. Cl.................. 219/60 A, 219/61, 219/161
[51] Int. Cl............................................... B23k 9/02
[58] Field of Search............ 219/60 A, 60 R, 61, 64, 219/125 R, 161

[56] References Cited
UNITED STATES PATENTS

| | | | |
|---|---|---|---|
| 3,688,070 | 8/1972 | Smith | 219/60 A |
| 3,069,529 | 12/1962 | Gotch | 219/60 A |
| 2,227,194 | 12/1940 | Moise et al. | 219/60 A |
| 3,238,347 | 3/1966 | Rohrberg et al. | 219/60 A |

*Primary Examiner*—C. L. Albritton
*Attorney, Agent, or Firm*—John N. Wolfram

[57] ABSTRACT

A method and apparatus for welding one member to another, one of the members being formed with a locating means spaced a predetermined distance from the intended location of the weld relative to such one member. The apparatus includes a welding tip and a means for clamping both members in position for welding. The clamping means has a locating means cooperable with the locating means on the one member and so spaced from the welding tip that when the members are clamped the welding tip will be automatically positioned opposite the intended location of the weld.

13 Claims, 4 Drawing Figures

METHOD AND APPARATUS FOR WELDING

BACKGROUND OF THE INVENTION

This invention is applicable to the use and construction of welding tools of the general type shown in U.S. Letters Pat. No. 3,534,199. This patent discloses a tool for welding together in axial alignment two tubular or other generally circular members. The tool includes means for clamping the members to be welded in end to end abutting relation and has a welding tip movable arcuately about the circular members for welding the same. The tool also includes a visual means for locating the weld but there is no positive means for locating the circular members within the clamping means so as to insure that the intended location of the weld on the circular members will be opposite the welding tip. The positioning of the circular members is left to the operator's visual judgment.

SUMMARY OF THE INVENTION

This invention provides a method and structure whereby a member to be welded by a welding tool of the general type referred to herein may be accurately positioned within the tool so that the welding tip will be automatically positioned opposite the intended location of the weld. This is accomplished by providing a first locating means, preferably in the form of an annular rib, on one of the members to be welded and providing a second locating means, preferably in the form of a groove to receive the rib, on the clamping means of the welding tool, and with the rib and groove being respectively axially positioned relative to the intended weld location and the welding tip so that the welding tip will be opposite the intended location of weld when the member is clamped in the tool with the two locating means in cooperating relationship with each other.

DETAIL DESCRIPTION

Figure 1:
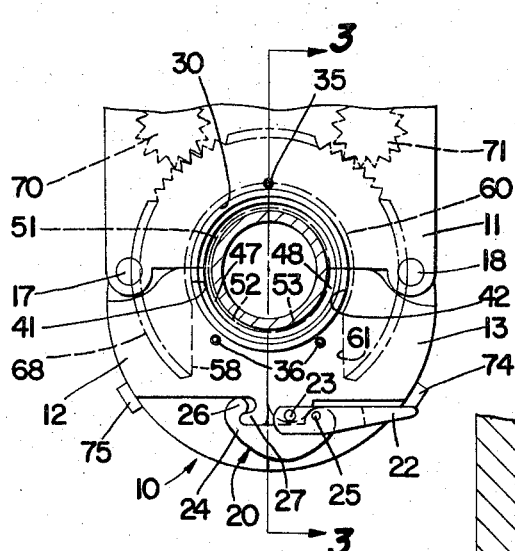
FIG. 1 is a fragmentary plan view of the welding tool with a pair of tubular members to be welded clamped therein.

Welding tool 10 has a body 11 with clamping arms 12, 13, 14 and 15 pivotally attached thereto by means of pins 17, 18. A pair of latching mechanisms, generally designated 20, 21, each includes an operating handle 22 pivotally attached respectively to arms 13 and 15 by pins 23 and which carry links 24 attached thereto by pins 25. Links 24 have hook portions 26 for engaging behind projections 27 on arms 12 and 14 to lock arm 12 to arm 13 and arm 14 to arm 15 when the arms are in a closed or clamping position as shown.

Mounted in semicircular recesses 30, 31 of body 11 by tongue and groove connections 33, 34 and pins 35 are semicircular clamping blocks 39 and 40 mounted in quarter circle arcuate recesses 41, 42, 43, and 44 respectively of arms 12, 13 and 15 by tongue and groove connections and pins 36 are quarter circular clamping blocks 47, 48, 49 and 50. Blocks 39, 47 and 48 have locating grooves 51, 52 and 53 formed in the arcuate recesses therein.

Within body 11 is a welding tip 57 mounted on a carrier 58 and held thereon by a set screw 59. Carrier 58 has a central partially circular opening 60 and a side opening 61 and is rotatably supported within insulating member 62 in body 11. Member 62 likewise has partially circular openings 64, 65 and a side opening 66.

Carrier 58 has a series of gear teeth 68 on its outer periphery engaged by drive gears 70, 71 for rotating the same. Carrier 58 also has an electrical contact partial ring 72 on its outer surface.

Figure 2:
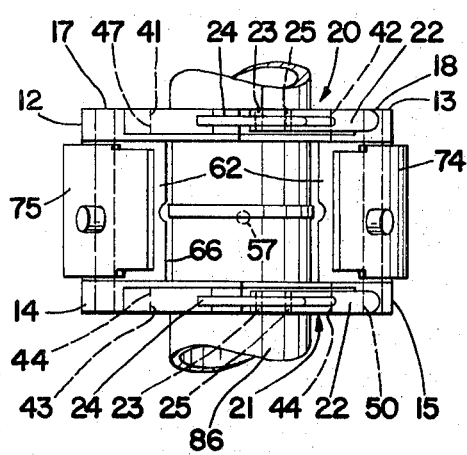
FIG. 2 is an end view of the tool with the tubular members clamped therein.
Figure 3:
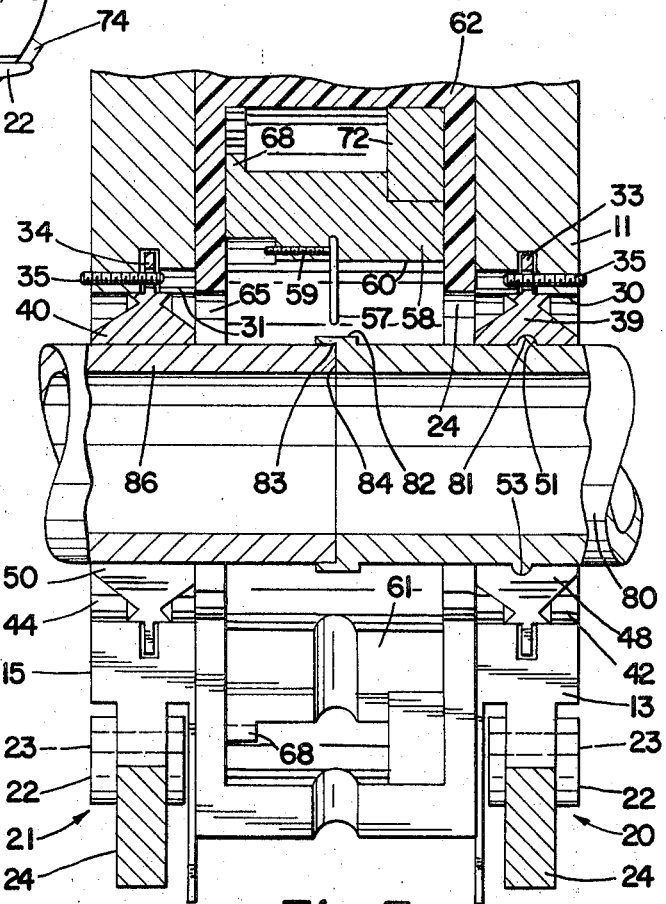
FIG. 3 is an enlarged cross sectional view along the lines 3—3 of FIG. 1.

Slidably mounted on insulation member 62 are a pair of plastic covers 74, 75 that are shown in open position in FIG. 2, but which may be moved toward each other for closing side opening 66 in member 62.

Clamped by blocks 39, 47 and 48 is a first tubular member 80 that has an annular locating rib 81 thereon received in locating grooves 51, 52 and 53. Member 80 preferably has an enlarged diameter end 82 with a counterbore 83 and internal shoulder 84 that receives the end of a second tubular member 86 that is clamped by blocks 40, 43 and 44. The axial distance between rib 81 and shoulder 84 where a weld 87 is to be formed for joining members 80, 86 is the same as the axial distance between grooves 51, 52, 53 and welding tip 57.

Other than for grooves 51, 52, 53 and their relationship with rib 81, weld tip 57 and shoulder 84, the detail construction of the welding tool 11 and its clamping mechanisms 20, 21 are not a part of the present invention. The invention comprises the method of providing blocks 39, 47, 48 with grooves 51, 52, 53 cooperable with rib 81 formed on member 80 and with such grooves spaced from welding tip 57 and with rib 81 spaced from shoulder 84 such that shoulder 84 will be automatically located opposite tip 57 when members 80, 86 are clamped in tool 11 with rib 81 received in grooves 51, 52, 53.

OPERATION

Figure 4:
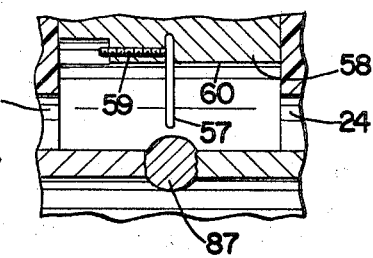
FIG. 4 is a cross sectional view of part of FIG. 3 after the members have been welded together.

In operation, covers 74, 75 are moved to open position, handles 22 are manipulated for releasing hooks 26 from projections 27, and arms 12, 13, 14 and 15 are swung to open position about pins 17, 18 so that members 80, 86 can be inserted through openings 66 and 58 into clamp blocks 39, 40 and with rib 81 within groove 51. This automatically locates the desired weld plane, shoulder 84, opposite welding tip 57. Arms 12, 13, 14 and 15 are then swung to closed position and secured by latch mechanisms 20, 21 as shown in FIGS. 1 and 2, causing the clamp blocks to tightly grip members 80 and 86. In this position, rib 81 will, of course, also be within grooves 52, 53 of blocks 47, 48. Covers 74, 75 may then be moved to closed position and the electrical portion of the tool energized for introducing electrical current into weld tip 57 via conductor ring 72 and carrier 58. The tool is then manipulated, as explained in U.S. Pat. No. 3,534,199 to cause drive gears 70, 71 to rotate carrier 58 via gear teeth 68 for a full revolution and cause weld tip 57 to create weld 87 completely around members 80, 86. Weld 87, as shown in FIG. 4, penetrates completely through enlarged end 82 and the tube member 80 and 86. The electric current is then shut off and covers 74, 75 and clamping arms 12, 13, 14 and 15 opened up so that the members 80, 86 can be withdrawn from the tool, or vice versa.

I claim:

1. A method of locating a first circular member to be welded to a second circular member in a welding apparatus having a clamping means and a welding tip, said method comprising the steps of:
   a. providing a first locating means fixed on the first circular member and axially spaced a predetermined distance from the intended location of the weld with respect to said first circular member,
   b. providing a second locating means in a fixed position on the apparatus that is interlockingly cooperable with said first locating means and which is axially spaced a predetermined distance from said welding tip,
   c. and providing means on said apparatus for clamping the circular member therein with said first locating means interlocked with said second locating means, said predetermined distances being such that said tip is opposite said intended weld location when said first circular member is clamped in said apparatus as aforesaid.

2. The method of claim 1 in which said predetermined distances are substantially equal.

3. The method of claim 1 in which one of said locating means is an annular rib and the other is a groove for receiving the rib.

4. The method of claim 3 in which the rib is on said first circular member and the groove is in said clamping means.

5. The method of claim 1 in which said apparatus is also provided with another means for clamping said second member in a fixed relation to said first member.

6. The method of claim 5 in which said another clamping means fixes the axial position of said second member only by frictional engagement therewith.

7. The method of claim 1 in which said first circular member is provided with a circular recess at said weld location for receiving and radially locating an end portion of said second member.

8. The method of claim 1 in which said second locating means is on said clamping means.

9. The method of claim 1 in which said first and second locating means include sets of transverse surfaces engageable for preventing axial movement of said first circular member in either direction relative to said clamping means.

10. An apparatus for welding a first circular member to another member wherein the first circular member has a first locating means fixed thereon and spaced a predetermined distance from the intended location of the weld relative to the first member, said apparatus comprising a welding tool in which a welding tip is mounted and including a first clamping means operable for fixedly clamping said first member, and said clamping means having a second locating means interlockingly cooperable with said first locating means and so located relative to said tip that when said first member is clamped by said clamping means said first member is located in said body with said tip opposite said intended location for the weld.

11. The apparatus of claim 10 in which said tool includes another clamping means for rigidly clamping a second member that is to be welded to said first member.

12. The apparatus of claim 10 in which said locating means on said clamping means is a groove for receiving a rib on the first member.

13. The apparatus of claim 11 in which said another clamping means is devoid of a locating means whereby said second member may be axially located in said tool without interference from second clamping means.

* * * * *